United States Patent
Bales et al.

(10) Patent No.: US 11,602,809 B2
(45) Date of Patent: Mar. 14, 2023

(54) PROCESSES AND TOOLING ASSOCIATED WITH DIFFUSION BONDING THE PERIPHERY OF A CAVITY-BACK AIRFOIL

(71) Applicant: Raytheon Technologies Corporation, Farmington, CT (US)

(72) Inventors: Daniel A. Bales, Avon, CT (US); Thomas DeMichael, Stafford Springs, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 17/169,893

(22) Filed: Feb. 8, 2021

(65) Prior Publication Data
US 2021/0220951 A1 Jul. 22, 2021

Related U.S. Application Data

(62) Division of application No. 16/025,047, filed on Jul. 2, 2018, now Pat. No. 10,913,133.

(51) Int. Cl.
| | | |
|---|---|---|
| *B23P 15/04* | (2006.01) | |
| *B23K 20/02* | (2006.01) | |
| *F01D 5/14* | (2006.01) | |
| *B23K 101/00* | (2006.01) | |

(52) U.S. Cl.
CPC .............. *B23P 15/04* (2013.01); *B23K 20/02* (2013.01); *F01D 5/147* (2013.01); *B23K 2101/001* (2018.08); *F05D 2230/236* (2013.01); *F05D 2230/60* (2013.01); *F05D 2230/90* (2013.01)

(58) Field of Classification Search
CPC ......... B23P 15/04; B23K 20/02; B23K 20/16; B23K 20/026; B23K 20/26; B23K 20/002; B23K 20/22; B23K 2101/001; B23K 37/0426; B23K 2103/14; B23K 3/087; B23K 1/19; B23K 1/20; B23K 1/0018; F01D 25/285; F01D 5/147; F01D 5/282;
(Continued)

(56) References Cited

U.S. PATENT DOCUMENTS

| | | | | |
|---|---|---|---|---|
| 4,855,011 | A | * | 8/1989 | Legge .................. B29C 33/02 156/583.1 |
| 5,099,573 | A | | 3/1992 | Krauss |
| 5,690,323 | A | | 11/1997 | Püttmer et al. |

(Continued)

FOREIGN PATENT DOCUMENTS

| | | |
|---|---|---|
| DE | 19547952 A1 | 6/1997 |
| EP | 3434867 A1 | 1/2019 |

OTHER PUBLICATIONS

European Search Report dated Nov. 18, 2019 issued for corresponding European Patent Application No. 19183388.8.

*Primary Examiner* — Moshe Wilensky
(74) *Attorney, Agent, or Firm* — Bachman & LaPointe, P.C.

(57) ABSTRACT

A fixture assembly includes a first fixture portion, a second fixture portion that interfaces with the first fixture portion, and a sub-fixture movably mounted to the first fixture portion. A multiple of actuators selectively move the sub-fixture toward the second fixture portion. A method of manufacturing a fan blade includes deploying the sub-fixture from the first fixture portion to effectuate a peripheral diffusion bond to join the blade body and the cover of the fan blade.

14 Claims, 11 Drawing Sheets

(58) Field of Classification Search
CPC ........... F05D 2230/236; F05D 2230/60; F05D 2230/90
See application file for complete search history.

(56) References Cited

U.S. PATENT DOCUMENTS

| | | |
|---|---|---|
| 5,933,951 A | 8/1999 | Bergue et al. |
| 6,003,756 A | 12/1999 | Rhodes |
| 9,771,807 B2 | 9/2017 | Radomski |
| 2015/0190893 A1 | 7/2015 | Parkin et al. |
| 2016/0311052 A1 | 10/2016 | Wallis et al. |
| 2018/0044037 A1 | 2/2018 | Littlejohn et al. |
| 2019/0032674 A1* | 1/2019 | Bales .................... F04D 29/325 |

* cited by examiner

PROCESSES AND TOOLING ASSOCIATED WITH DIFFUSION BONDING THE PERIPHERY OF A CAVITY-BACK AIRFOIL

CROSS-REFERENCE TO RELATED APPLICATION

This application is a divisional of U.S. patent application Ser. No. 16/025,047, filed Jul. 2, 2018.

BACKGROUND

The present disclosure relates to tooling, more particularly, to a system for diffusion bonding the periphery of a cavity-back fan blade.

Gas turbine engines, such as those that power modern commercial and military aircraft, generally include a fan section, a compressor section to pressurize an airflow, a combustor section to burn a hydrocarbon fuel in the presence of the pressurized air, and a turbine section to extract energy from the resultant combustion gases. The fan section often utilizes relatively large fan blades of a complicated airfoil shape. Titanium-based alloys provide exceptional fatigue properties, erosion benefits relative to aluminum alloys, and are light weight compared to steel, stainless steels, and nickel alloys. Diffusion bonding may be used for manufacturing hollow, high-temperature alloy components with complex geometries.

Hollow titanium fan blades may be manufactured by diffusion bonding two machined cavity-containing plates on a neutral axis, hot forming, then pressurizing the bonded assembly to achieve its final shape within complex dies. The bonded blade subsequently must be twisted into the proper airfoil configuration, then internally pressurized to expand the relatively thin walls which have collapsed via creep during the prior diffusion bonding steps.

Manufacture of hollow titanium fan blades require substantial investments in equipment and materials and often have limited throughput and yield. Part of the manufacturing challenge is that fusion welding may result in a degradation of ductility, which is a key mechanical property for withstanding a bird impact; as well as degradation of fatigue strength, which is a key mechanical property for an airfoil's extended service life.

SUMMARY

A fixture assembly according to one disclosed non-limiting embodiment of the present disclosure includes a first fixture portion; a second fixture portion that interfaces with the first fixture portion; a sub-fixture movably mounted to the first fixture portion; and a multiple of actuators to selectively move the sub-fixture toward the second fixture portion.

A further aspect of the present disclosure includes wherein the sub-fixture defines a perimeter within the first fixture portion.

A further aspect of the present disclosure includes wherein the sub-fixture is rectangular.

A further aspect of the present disclosure includes wherein the sub-fixture defines a peripheral fusion bond to join a cover to a blade body.

A further aspect of the present disclosure includes wherein the cover and the blade body form a fan blade for a gas turbine engine.

A further aspect of the present disclosure includes wherein each of the multiple of actuators comprise a bellows mounted to a sub-fixture element.

A further aspect of the present disclosure includes a heating element within the sub-fixture element of the sub-fixture.

A further aspect of the present disclosure includes wherein each of the multiple of actuators comprise a temperature sensor.

A further aspect of the present disclosure includes wherein each of the multiple of actuators comprise a pressure sensor.

A further aspect of the present disclosure includes wherein each of the multiple of actuators comprise a heating element and a bellows.

A further aspect of the present disclosure includes a multiple of heater elements within the second fixture portion along a locally protruding area opposite the sub-fixture.

A method of manufacturing a fan blade according to one disclosed non-limiting embodiment of the present disclosure includes moving a first fixture portion toward a second fixture portion; heating a sub-fixture located at least partially within the first fixture portion; and deploying the sub-fixture from the first fixture portion to effectuate a peripheral fusion bond to join a blade body and a cover of the fan blade.

A further aspect of the present disclosure includes wherein moving the second fixture portion toward the first fixture portion comprises movement of 8-12 inches (203-304 mm).

A further aspect of the present disclosure includes wherein deploying the sub-fixture from the first fixture portion comprises movement of 0.040-0.200 inches (4-51 mm).

A further aspect of the present disclosure includes wherein deploying the sub-fixture from the first fixture portion comprises pressurizing a multiple of actuators.

A further aspect of the present disclosure includes, wherein heating a sub-fixture comprises heating a heating element within a sub-fixture element.

A further aspect of the present disclosure includes measuring a temperature at each sub-fixture element.

A further aspect of the present disclosure includes measuring a pressure at each of the multiple of actuators.

A further aspect of the present disclosure includes heating the second fixture portion.

The foregoing features and elements may be combined in various combinations without exclusivity, unless expressly indicated otherwise. These features and elements as well as the operation of the invention will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
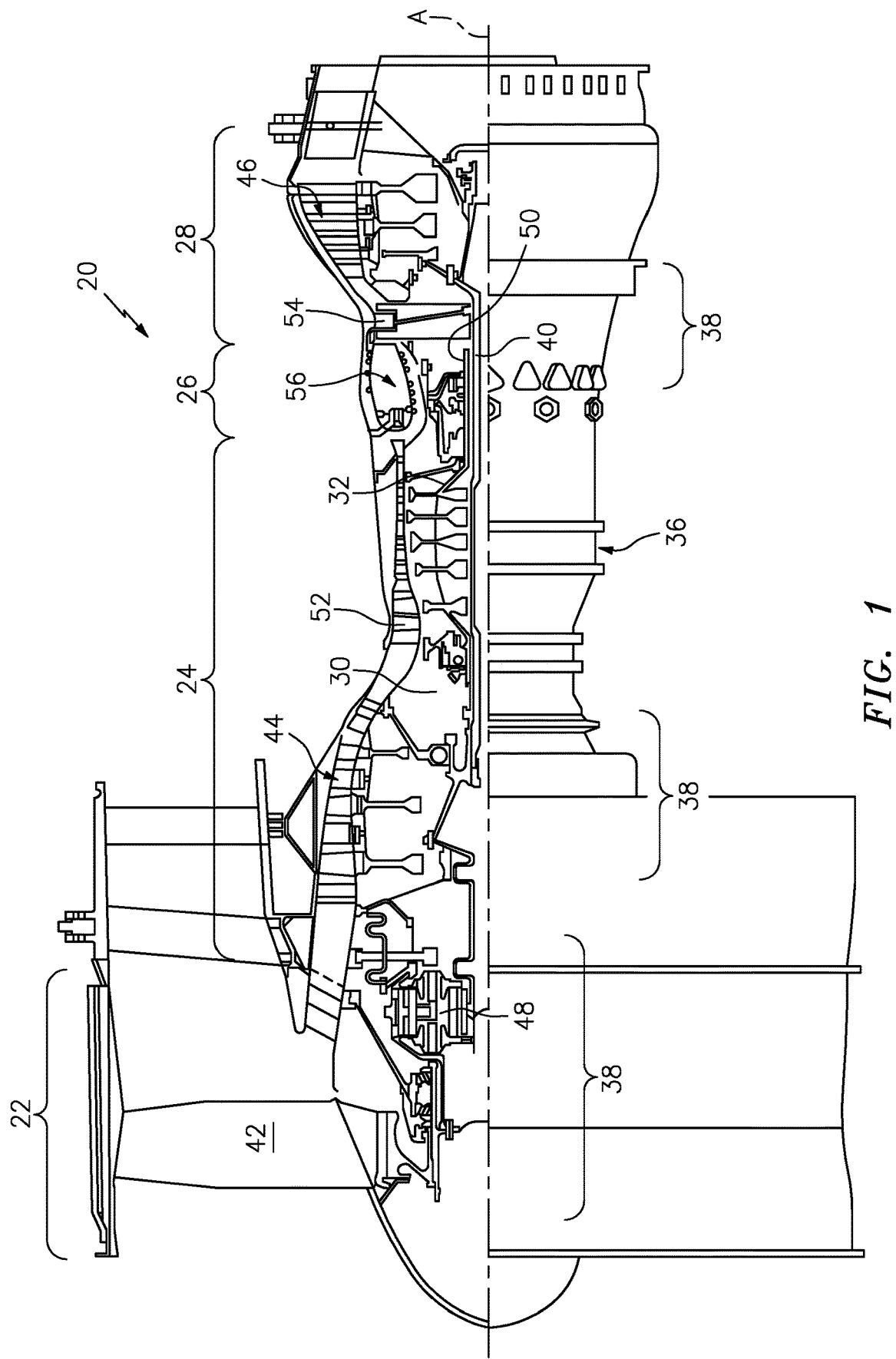
FIG. 1 is a schematic cross-section of a gas turbine engine.

FIG. 1 schematically illustrates a gas turbine engine 20. The gas turbine engine 20 as disclosed herein has a two-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate around the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by the bearing compartments 38. It should be appreciated that various bearing compartments 38 at various locations may alternatively or additionally be provided.

The fan section 22 includes a plurality of circumferentially spaced fan blades 58 (FIG. 2) which may be made of a high-strength, low weight material such as a titanium alloy, composite material or combinations thereof. In one example, the fan blade 58 has a chord of about 12 inches (305 mm) and a span of about 30 inches (762 mm).

Figure 2:
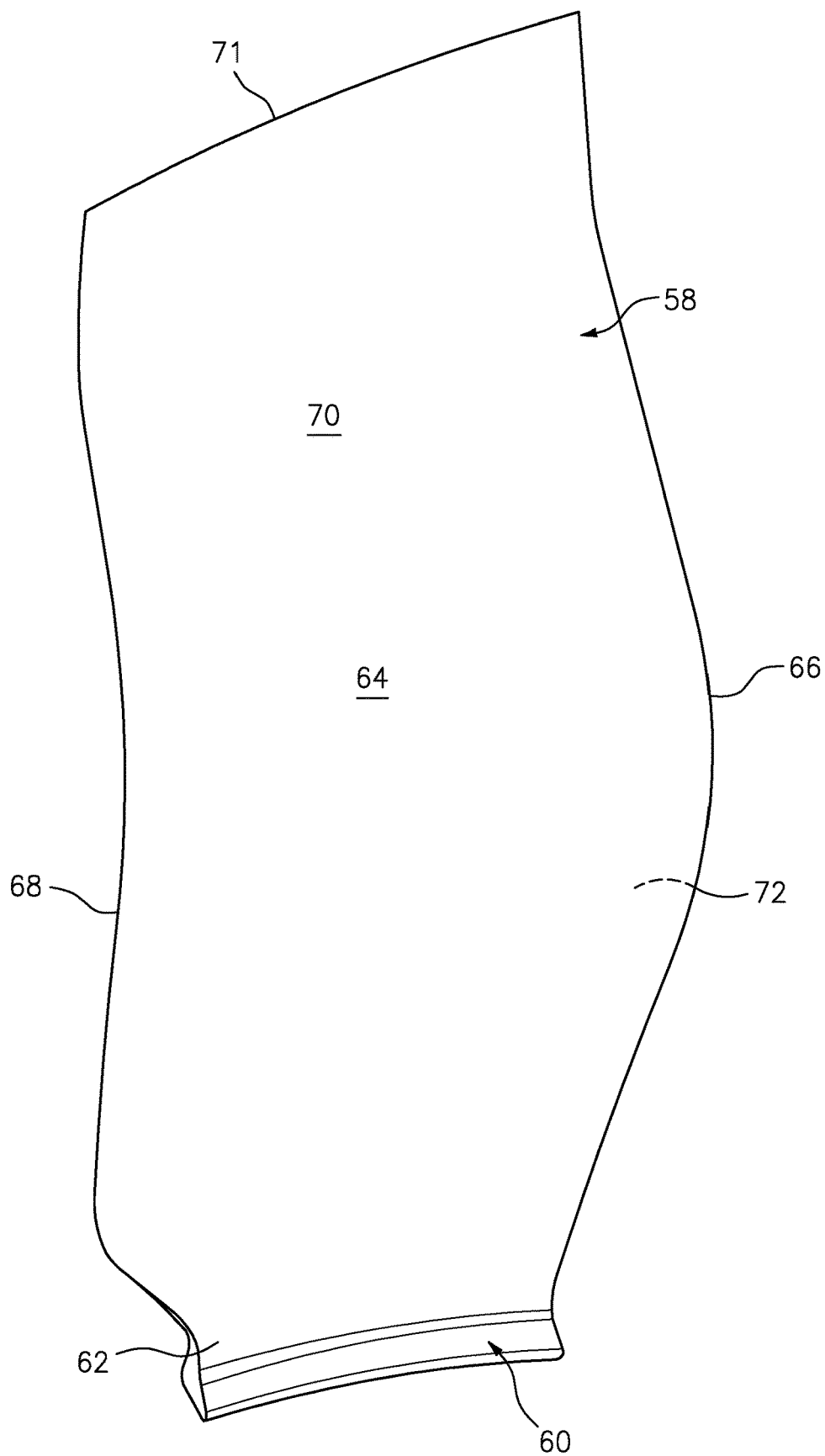
FIG. 2 is a schematic view of a fan blade for use in the gas turbine engine shown in FIG. 1.
Figure 3:
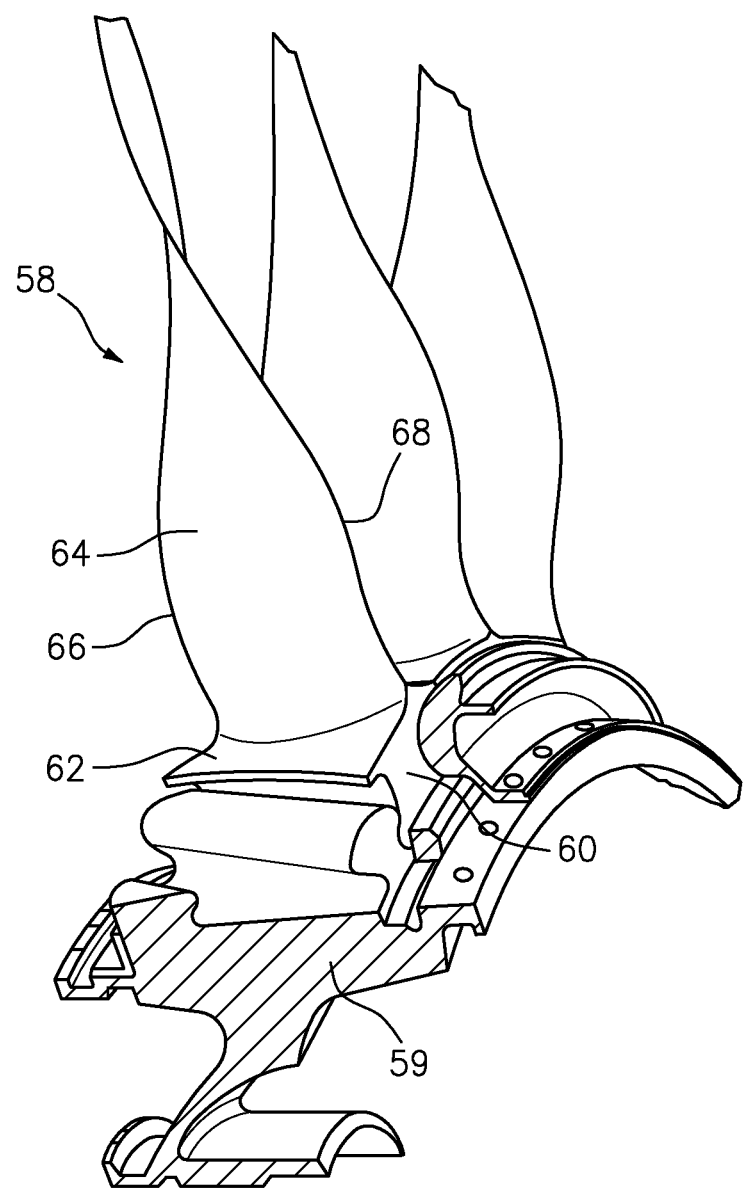
FIG. 3 is a perspective view of a rotor disk with the fan blade of FIG. 2 installed.

With reference to FIG. 2 and FIG. 3, each fan blade 58 generally includes an innermost root portion 60, an intermediate portion 62, an airfoil mid-span portion 64 and an outermost airfoil portion 71. In one form, the root portion 60 defines an attachment such as an inverted fir tree, bulb, or dovetail, so the fan blade 58 is slidably received in a complimentary configured recess provided in a fan rotor 59. The intermediate portion 62 may be a mechanically attached platform or integral that is generally between the root portion 60 and the airfoil mid-span portion 64 to define an inner boundary of the air flow path. The airfoil mid-span portion 64 defines a blade chord between a leading edge 66, which may include various forward and/or aft sweep configurations, and a trailing edge 68. A concave pressure side 70 and a convex suction side 72 are defined between the leading edge 66 and the trailing edge 68. Although a fan blade 58 is illustrated in the disclosed non-limiting embodiment, other hollow structures such as compressor blades, turbofan blades, turboprop propeller blades, tilt rotor props, vanes, struts, and other airfoils may benefit herefrom.

Figure 4:
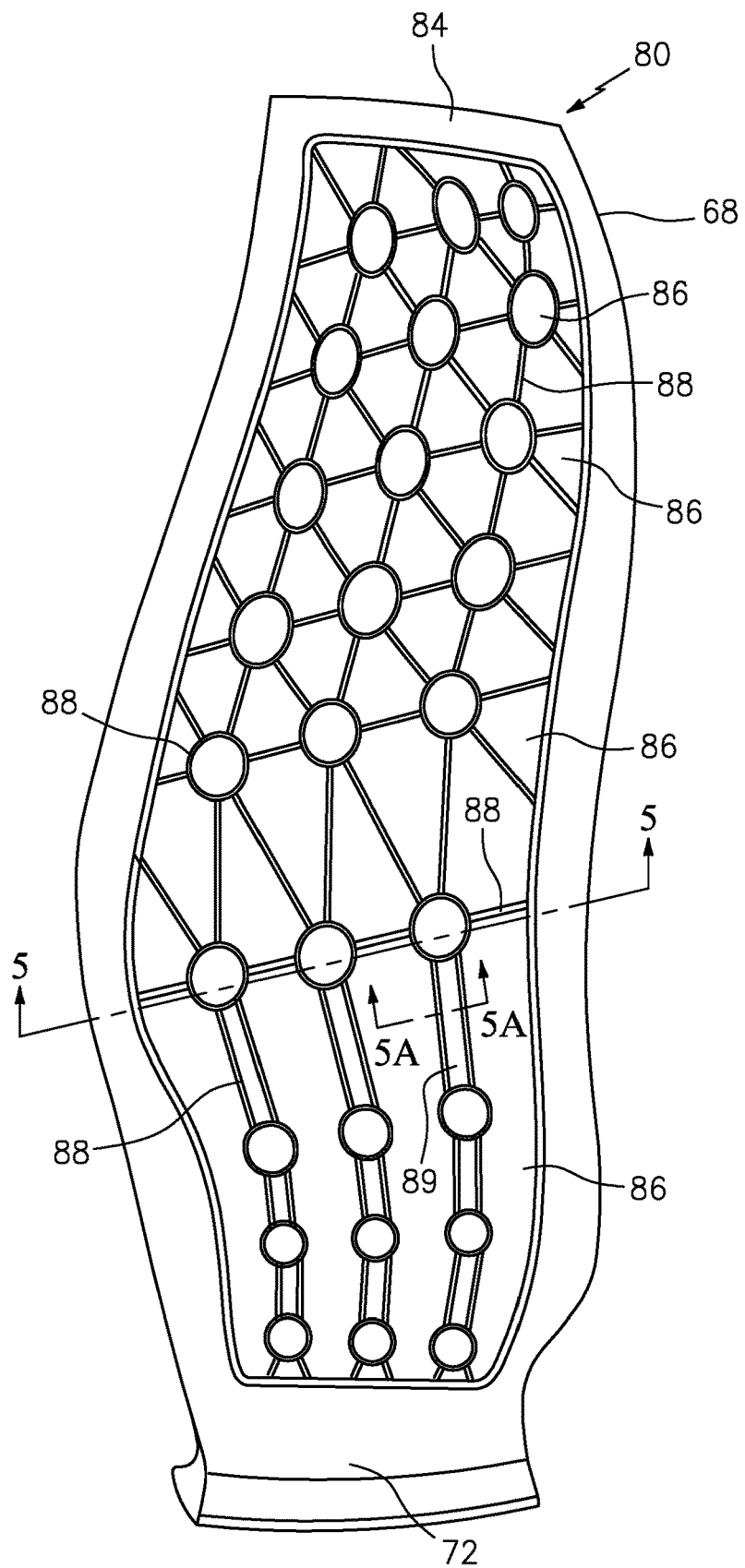
FIG. 4 is an exploded view showing internal cavities of the example fan blade of FIG. 2.
Figure 5A:
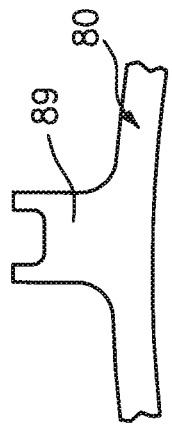
FIG. 5A is a sectional view of the rib of the example fan blade of FIG. 2.
Figure 5:
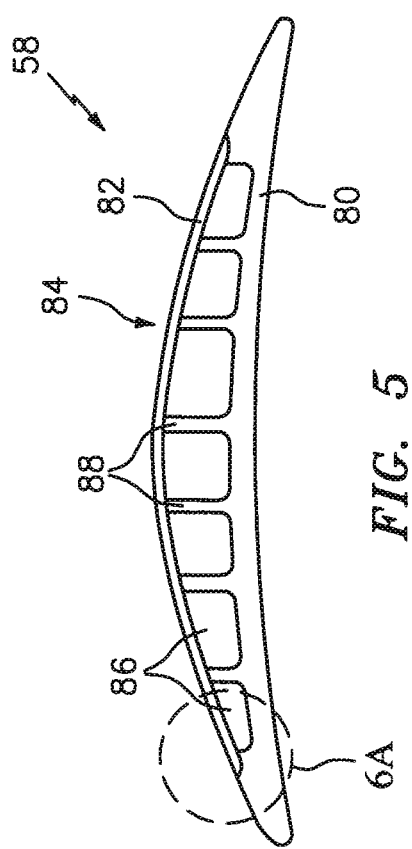
FIG. 5 is a sectional view of the example fan blade of FIG. 2.

With reference to FIG. 4, each fan blade 58 is manufactured from a blade body 80 and a cover 82 that are joined (e.g., brazed, bonded, welded, etc.) to one another to provide an exterior contour 84 of the fan blade 58 (FIG. 5). In the example, the blade body 80 is provided by a forged blank that is machined to remove material 86. The ribs 88 may be of various configurations such as rib 89 (FIG. 5A) to reduce weight while providing fan blade structural integrity, ensuring blade fatigue life to support the cover 82. The blade body 80 provides the root portion 60 and one side of the airfoil mid-span portion 64 along with the outermost airfoil portion 71. The blade body 80 also provides the fan blade leading and trailing edges 66, 68.

The cover 82 may be secured to the blade body 80 by brazing, welding, bonding or other material or method. The cover 82 is typically on the convex side. The cover 82 may be manufactured of titanium for its thermal expansion match with the titanium blade body 80. The cover 82 may be hot formed at processing conditions that ensure maintaining its certified mechanical properties, while achieving the desired shape for bonding. In one example, the cover 82 is about 60 to 90 thousandths of an inch (1.5-2.25 mm) in thickness and is superplastically formed to an airfoil shape.

Figure 6A:
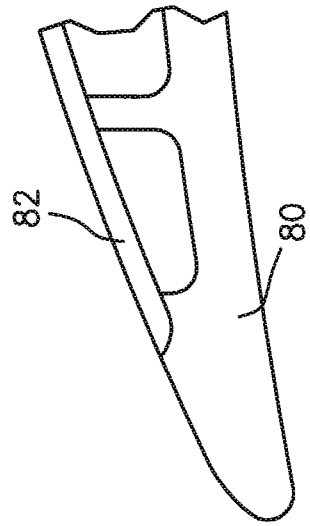
FIG. 6A is an expanded view of a portion of the example fan blade of FIG. 2 taken in the area designated in FIG. 5 in an assembled condition.
Figure 6:
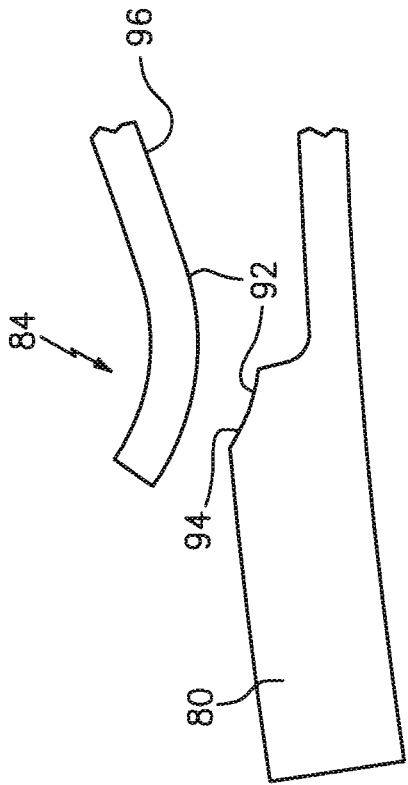
FIG. 6 is an expanded view of a portion of the example fan blade of FIG. 2 taken in the area designated in FIG. 5.

The material 92, for example, braze material or cathodic arc deposited coating is provided on one or both of the first and second mating surfaces 94, 96, which are respectively provided by the blade body 80 and the cover 82 (FIGS. 6 and 6A). The material 92 may be pre-placed onto either the titanium blade body 80 or the cover 82 as a photo etched pre-form or a cathodic arc deposit. In one example, the entire surface 96 of the cover 82 being joined to the blade body 80 would be cathodic arc deposited. In one example, the entire surface of the blade body 80 would be cathodic arc coated prior to machining the blade body 80 and the material 92 would be deposited onto surface 96 prior to selective etching the titanium cover 82 to only provide material 92 at areas being joined.

Figure 7:
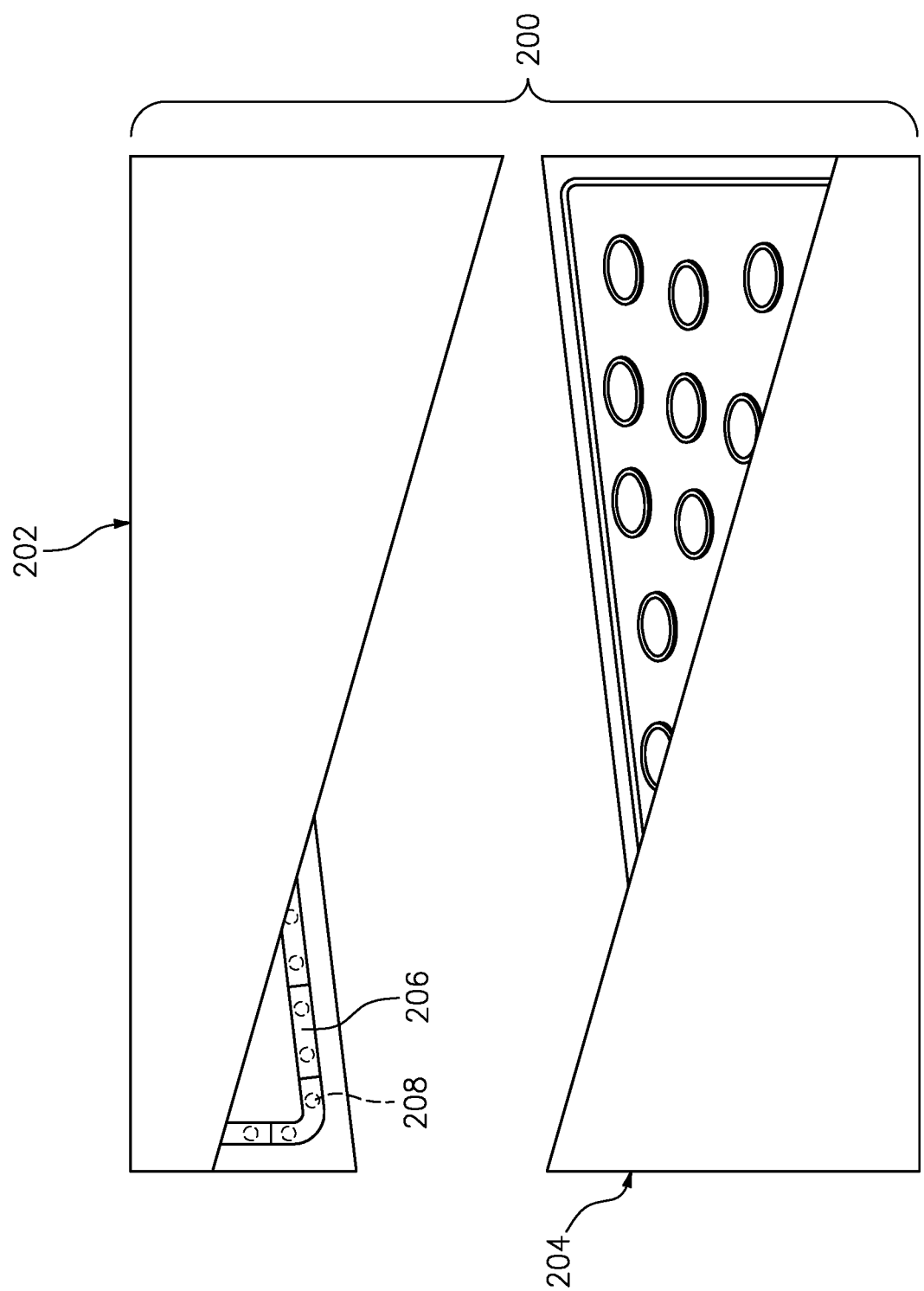
FIG. 7 is a perspective view of a fixture assembly to assembly the fan blade of FIG. 2.

With reference to FIG. 7, a fixture assembly 200 for manufacturing the fan blade 58 generally includes a first fixture portion 202 and a second fixture portion 204 that interfaces with the first fixture portion 202. The airfoil contour of the first fixture portion 202 and the second fixture portion 204 are generally rectangular with an approximate twist of from about +30 degrees to about −30 degrees (FIG.

8). The first fixture portion 202 may be shaped to the airfoil contour to receive the blade body 80.

Figure 8:
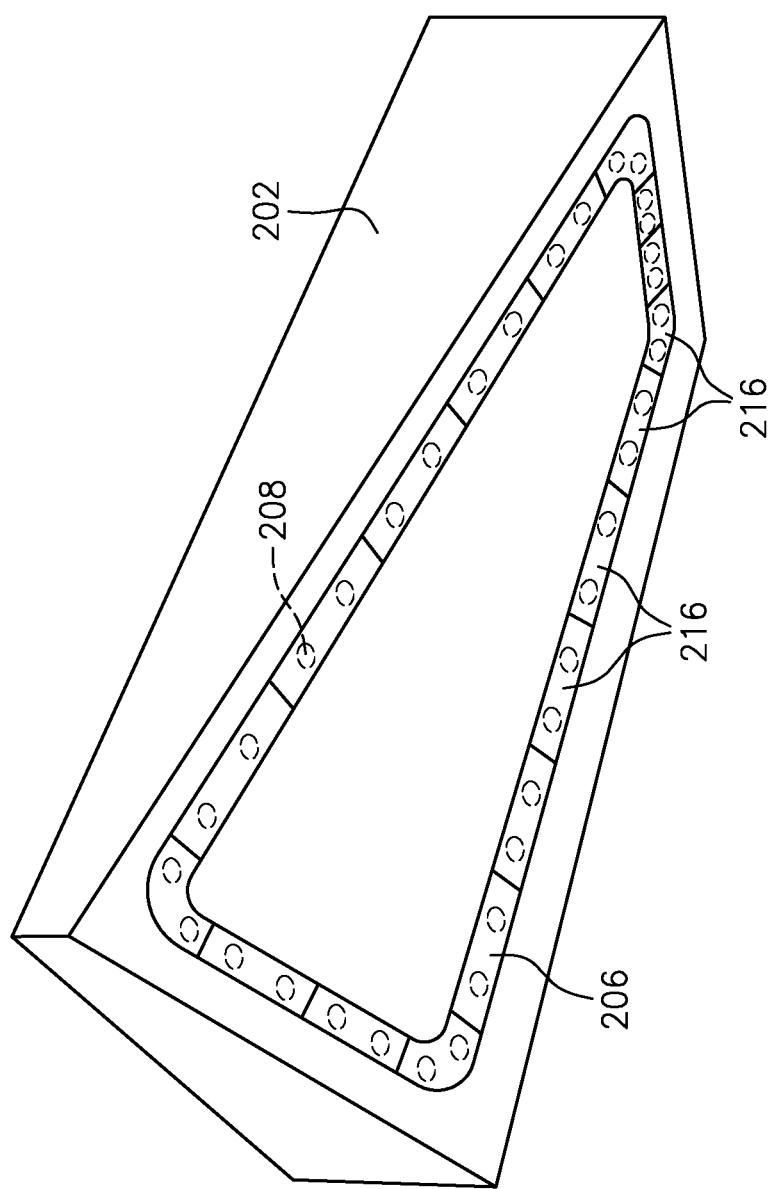
FIG. 8 is perspective view of a fixture portion and sub-fixture of the fixture assembly.

The second fixture portion 204 may be shaped to the airfoil contour to support the cover 82 with respect to the blade body 80 in response to movement of a sub-fixture 206 within the first fixture portion 202 which is driven by a multiple of actuators 208. The actuators 208 are arranged within the first fixture portion 202 such that the sub-fixture 206 defines the fusion bond area (FIG. 8) to join the cover 82 to the blade body 80. In this embodiment, diffusion bonding is utilized along the periphery via the use of a very fine grainsize coating for enhanced bonding and at lower temperatures than otherwise needed. The interior circular and racetrack ribs could be diffusion bonded, brazed, or welded. If diffusion bonded or brazed, the interior circular and racetrack ribs would likely be diffusion bonded or brazed concurrently or sequentially with the periphery diffusion bonding. If welded, the interior circular and racetrack ribs could be done prior to or after the periphery diffusion bond. The sub-fixture 206 concentrates the pressure and temperature while preventing distortion during the diffusion bonding operation. A machined recess 209 (FIG. 9) within the first fixture portion 202 receives the sub-fixture 206, provides support for the actuators 208, permits access for gas pressure lines, heating element wires, and sensor wires for thermocouples that provide for real-time monitoring of temperature, gas pressure, and diffusion bonding pressure.

Figure 9:
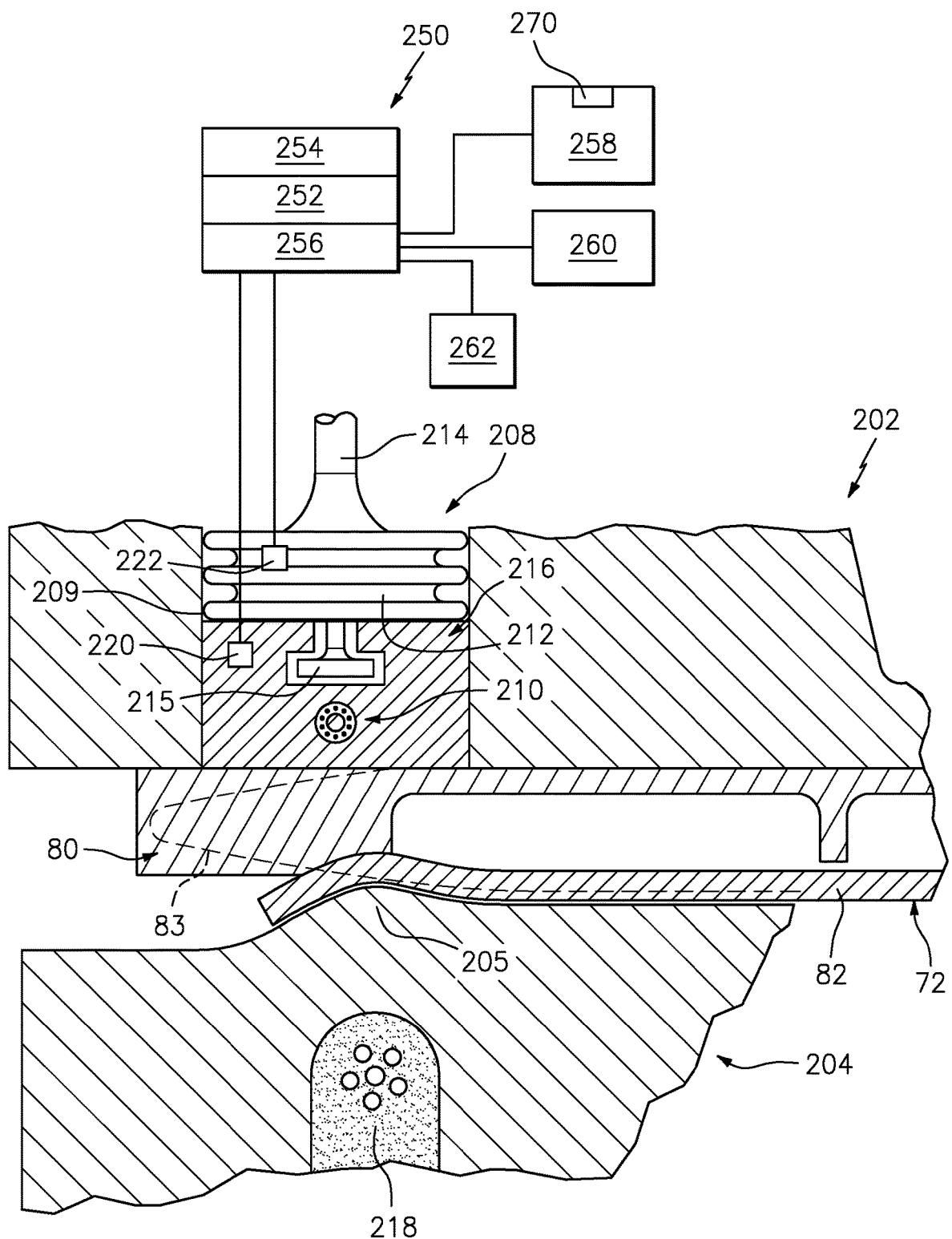
FIG. 9 is a sectional view of the actuator assembly according to one embodiment.
Figure 10:
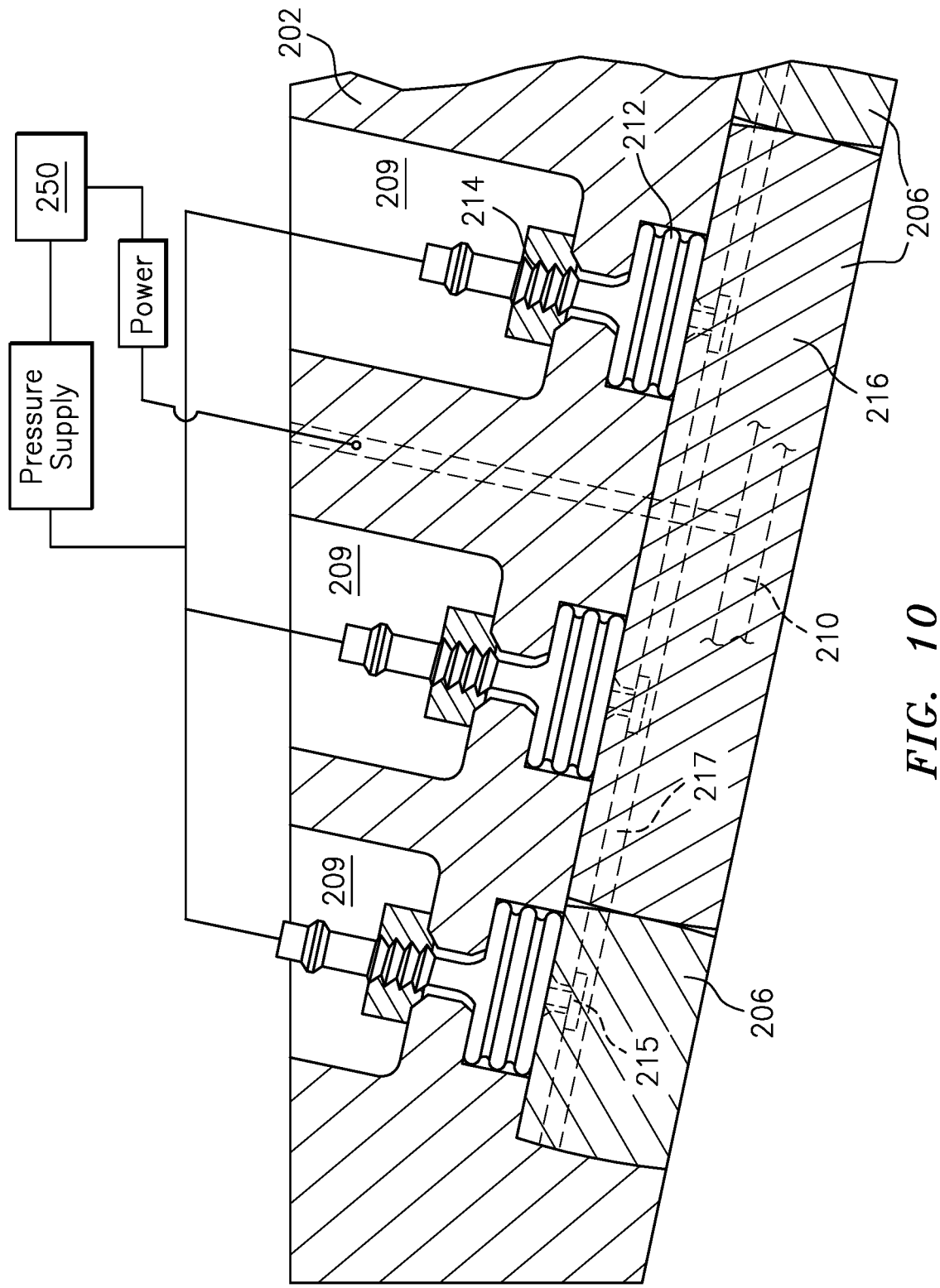
FIG. 10 is a sectional view of the sub-fixture of FIG. 9.

With reference to FIG. 9, each of the sub-fixture elements 216 includes a heating element 210. In examples, the heating element 210 may include a resistance heating element, or other such element that can provide upwards of 1600 degrees F. and is located within a sub-fixture element 216 (FIG. 10). The heating element 210 may be at least partially embedded in a sub-fixture element 216 of the sub-fixture 206. The sub-fixture element 216 of the sub-fixture 206 may be manufactured of a silicon nitride or other heatable material or combination of materials that distributes the heat from the heating elements 210. The sub-fixture 206 may be formed as a multiple of sub-fixture elements 216 to form a segmented 3D heatable and translatable fixture element that heats and applies pressure to the workpiece. Alternatively, the sub-fixture 206 may be formed as a single integral rectilinear shaped element. The heating element 210 within the sub-fixture elements 216 is generally opposed to a multiple of heating elements 218 in the second fixture portion 204 to bracket the peripheral fusion bond that joins the cover 82 to the blade body 80. That is, the multiple of heating elements 218 are opposite the sub-fixture 206. In one example, the internal ribs may be machined to a height below the periphery and in some embodiments need not be bonded, brazed, or welded and the circular ribs and racetrack shaped ribs may be machined to full height and will be bonded, brazed, or welded to the cover at their respective internal locations.

Figure 11:
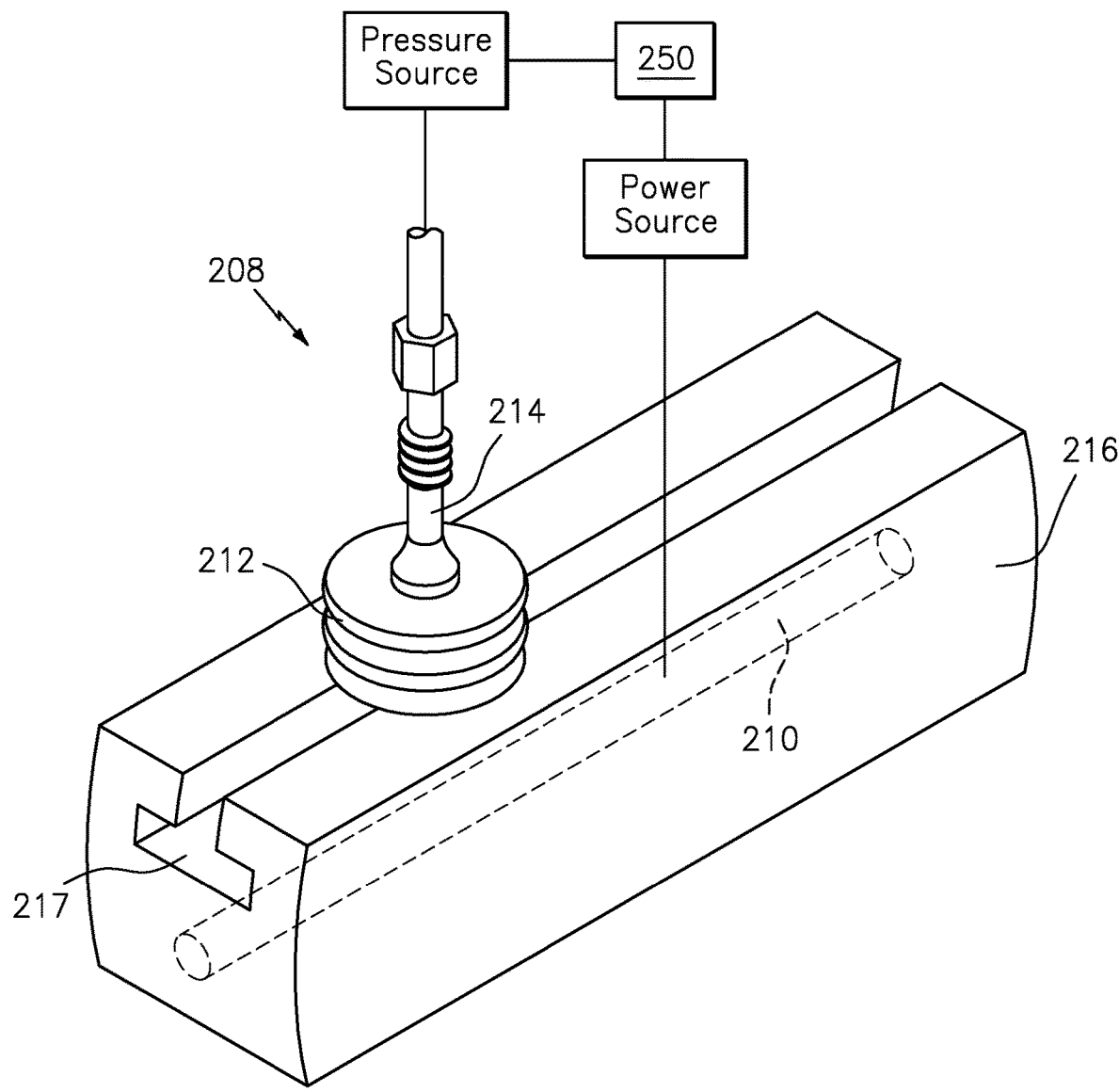
FIG. 11 is an exploded view of one sub-fixture element of the sub-fixture of FIG. 9.

Each actuator 208 includes a bellows 212 that may be about 1.5 inches (38 mm) in diameter. The bellows 212 includes a threaded attachment 214 for installation and removal from the first fixture portion 202 and a retainer 215 (FIG. 10) that is received within a "T" shaped slot 217 in the sub-fixture element 216 (FIG. 11). That is, each of the actuators 208 is located between the first fixture portion 202 and the sub-fixture element 216. The bellows 212 drive the heated sub-fixture elements 216 against the titanium blade body 80, thereby causing a protrusion 205 of the second fixture portion 204 that is opposite the sub-fixture 206 to engage the blade cover 82 and subsequently diffusion bond the cover 82 to the blade body 80.

Each of the actuators 208 are in communication with a control system 250. The control system 250 may include at least one processor 252 (e.g., a controller, microprocessor, microcontroller, digital signal processor, etc.), memory 254, and an input/output (I/O) subsystem 256. The control system 250 may be embodied as any type of computing device (e.g., a tablet computer, smart phone, body-mounted device or wearable device, etc.), a server, an enterprise computer system, a network of computers, a combination of computers and other electronic devices, or other electronic devices. Although not specifically shown, the I/O subsystem 256 typically includes, for example, an I/O controller, a memory controller, and one or more I/O ports. The processor 252 and the I/O subsystem 256 are communicatively coupled to the memory 254. The memory 254 may be embodied as any type of computer memory device (e.g., volatile memory such as various forms of random access memory). The I/O subsystem 256 may also be communicatively coupled to a number of hardware, firmware, and/or software components, including a data storage device 258, a display 260, and a user interface (UI) subsystem 262. The data storage device 258 may include one or more hard drives or other suitable persistent storage devices (e.g., flash memory, memory cards, memory sticks, and/or others). A database 270 may reside at least temporarily in the data storage device 258 and/or other data storage devices (e.g., data storage devices that are "in the cloud" or otherwise connected to the control system 250 by a network).

The control system 250 may also include other hardware, firmware, and/or software components that are configured to perform the functions disclosed herein, including, for example, a temperature sensor 220 for each sub-fixture element 216 and a pressure sensor 222 for each bellows 212. While not specifically shown, the control system 250 may include other computing devices (e.g., servers, mobile computing devices, etc.) and computer aided manufacturer (CAM) systems which may be in communication with each other and/or the control system 250 via a communication network to perform one or more of the disclosed functions.

Figure 12:
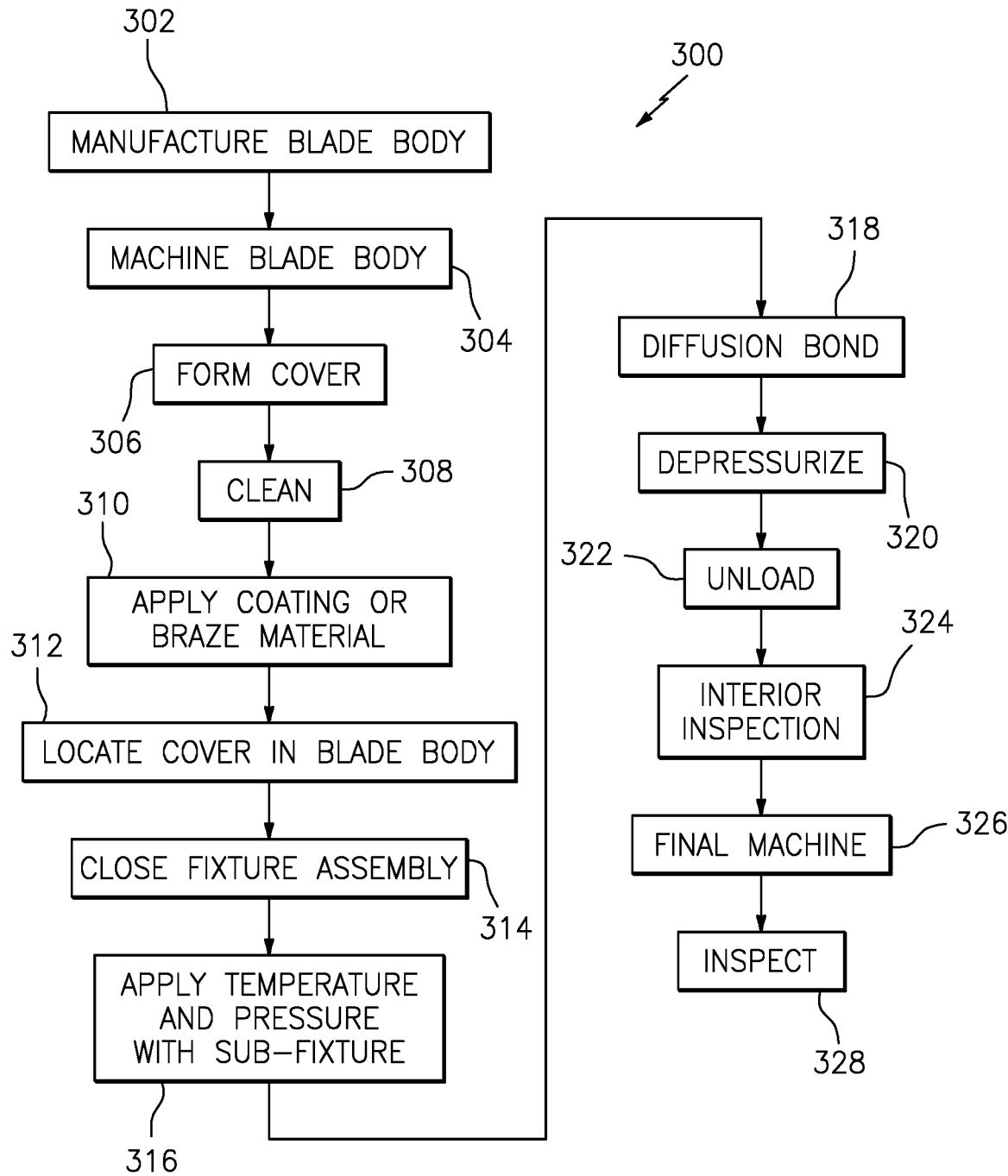
FIG. 12 is a flow diagram of a method of using the fixture assembly to assemble the fan blade.

With reference to FIG. 12, a method 300 for manufacturing the fan blade 58 is schematically disclosed in terms of a functional block diagram flowchart. It should be appreciated that alternative or additional steps may be provided without departing from the teaching herein.

Initially, the blade body 80 is manufactured (step 302). The blade body 80 may, for example, be produced as a near-net-shape titanium (e.g., Ti-6-4) blade forging (FIG. 4). In embodiments, the blade body 80 may include a squared off leading edge which is later finished (phantom line 83; FIG. 9) to form an aerodynamic leading edge.

Next, the blade body 80 is machined (step 304). In one embodiment, the convex suction side 72 is machined to form a cavity-back blade blank (FIG. 4). The machining forms the ribs 88 (FIG. 4) to reduce weight while providing fan blade structural integrity, ensuring blade fatigue life to support the cover 82.

Next, the cover 82 is formed (step 306). The cover, in one example, may be superplastic formed and chemical milled from titanium (e.g., Ti-6-4).

Next, the blade body 80 and the cover 82 are cleaned (step 308). In one example, the cleaning may include laser cleaning of the bond surfaces.

The material 92, when utilized, is then located on one or both of the first and second mating surfaces 94, 96 (step 310).

The cover 82 is then located (step 312) into the blade body 80 and placed (step 314) within the fixture assembly 200.

Initially, the first fixture portion 202 and the second fixture portion 204 are closed together to enclose the cover 82 and the blade body 80. In one example, the first fixture portion 202 is moved toward the second fixture portion 204 about 8-12 inches (203-304 mm). The first fixture portion 202, in one example, may be fixed and remain stationary. The second fixture portion 204 may be moved toward the first fixture portion 202 to generate a uniform concentrated load, however, further refinement of pressure and temperatures are provided through the sub-fixture 206.

Next, pressure is applied (step 316) to each of the multiple of actuators 208 to move the sub-fixture 206. That is, the multiple of actuators 208 press the blade body 80 into the cover 82. This may be performed while temperature is increased. In one example, the sub-fixture 206 may initially be 0.05-0.1 inches (1.3-2.5 mm), and more specifically 0.00-0.06 inches (0.0-1.5 mm) above the surface of the first fixture portion 202. In one example, the sub-fixture 206 moves about 0.040-0.200 inches (1-51 mm). Gas pressure is applied to the bellows 212 for each actuator 208 to drive the sub-fixture element 216 toward the workpiece to provide pressure to the cover 82 to achieve diffusion bonding to the blade body 80. The sensors 220, 222 permit individual control of each actuator 208 to tailor the interface along the periphery of the sub-fixture 206 to adjust the peripheral bond. That is, each actuator 208 may be individually controlled in temperature and pressure.

The cover 82 is then diffusion bonded and/or brazed (step 318) into the blade body 80 for the required temperature, time, and pressure. The pre-deposited material 92 enables reducing the otherwise elevated temperature processing to a temperature range of 1400-1600 degrees F. (760-871 degrees Celsius). Alternatively, an adhesive bond or a low temperature bond for composite components may also benefit herefrom to replace an autoclave and/or vacuum bagging. That is, various bonding, brazing, and/or adhesives may benefit herefrom. In the context of titanium alloys, for example, the heating means are sufficient to locally elevate the temperature at the interface to a range of about 1290 F (700 degrees C.) to about 1600 degrees F. (870 degrees C.). To prevent surface contamination during bonding and further facilitate localized bonding and temperature control, the diffusion bonding, brazing, and/or creep-forming operations utilizing bellows 212 will be performed in a vacuum, or a vacuum having a partial pressure of inert gas, e.g., argon, relative to an ambient condition. Alternatively, the process can be performed at atmospheric or greater pressures of argon in a vessel.

After the required bond temperature, time, and pressure have occurred, each of the multiple of actuators 208 is de-pressurized (step 320) and cooled to the required temperature.

The fan blade 58 is then unloaded (step 322). Interim inspection (step 324) may then be performed.

Then, the bonded fan blade 58 is final machined (step 326) then inspected (step 328).

The fixture and method provide a weight-neutral, cost effective, hollow titanium fan blade that can replace even a hybrid aluminum hollow fan blade. Such can eliminate complex, time consuming, costly processes presently necessary with non-titanium hollow fan blade manufacture. The method is also significantly more environmentally friendly because the reduction in elevated temperature processing time results in less surface contamination that must be removed by acids.

While the illustrated embodiment focuses on diffusion bonding a 3-dimensional (e.g., twisted) cavity-back airfoil blade body and a hot formed or superplastic formed 3-dimensional cover together to create a 3-dimensional (twisted) blade, such processing is expected to be adaptable and suitable for diffusion bonding of hollow blades or hollow vanes in a planar (e.g., flat) configuration.

A cavity-back fan blade utilizing welding or selective diffusion bonding reduces large-equipment needs, capital expenses, and end-product costs. The fixture assembly 200 and method 300 for use therewith provides a relatively compact system that can increase the efficiency of 3-D (e.g., twisted) cavity-back airfoil production processes via a hybrid process of a diffusion bonded periphery and/or a diffusion bonded or welded interior. This provides, for example, a finished fan blade having greater bird-strike margin, greater fatigue margin, and potentially lighter overall weight.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward," "aft," "upper," "lower," "above," "below," and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of manufacturing a fan blade for a gas turbine engine, comprising:

moving a first fixture portion, shaped to an airfoil contour to receive a blade body, toward a second fixture portion shaped to the airfoil contour to support a cover with respect to the blade body, wherein the cover has an edge that overlaps the body to define a periphery wherein the edge of the cover overlaps the body, wherein the first fixture portion comprises a multiple of sub-fixture elements defining a perimeter corresponding to the periphery;

heating the multiple of sub-fixture elements; and deploying the multiple of sub-fixture elements from the first fixture portion to effectuate a peripheral diffusion bond at the periphery to join the blade body and the cover of the fan blade at the periphery.

2. The method as recited in claim 1, wherein moving the first fixture portion toward the second fixture portion comprises movement of 8-12 inches (203-304 mm).

3. The method as recited in claim 1, wherein deploying the multiple of sub-fixture elements from the first fixture portion comprises movement of 0.040-0.200 inches (1-51 mm).

4. The method as recited in claim 1, wherein deploying the multiple of sub-fixture elements from the first fixture portion comprises pressurizing a multiple of actuators.

5. The method as recited in claim 4, wherein each sub-fixture element contains a heating element, and wherein heating the multiple of sub-fixture elements comprises heating the heating element within each sub-fixture element.

6. The method as recited in claim 5, further comprising measuring a temperature at each sub-fixture element.

7. The method as recited in claim 4, further comprising measuring a pressure at each of the multiple of actuators.

8. The method as recited in claim 1, further comprising heating the second fixture portion.

9. The method as recited in claim 1, wherein the deploying step comprises actuating a bellows located between the first fixture portion and the multiple of sub-fixture elements.

10. The method as recited in claim 1, wherein the deploying step comprises individually controlling each sub-fixture element to adjust peripheral diffusion bond for the cover in response to a temperature and a pressure at each sub-fixture element, wherein the individually controlling step produces at least one different pressure at different sub-fixture elements.

11. The method as recited in claim 4, wherein the multiple of actuators are associated with the multiple of sub-fixture elements.

12. The method as recited in claim 1, wherein the body defines a root, a blade tip and one of a suction or pressure side of the fan blade.

13. The method of claim 1, wherein the periphery is defined parallel to each of a root, a blade tip and sides defining a suction or pressure side of the fan blade.

14. The method of claim 13, wherein the deploying step deploys the multiple of sub-fixture elements from the first fixture portion to effectuate a peripheral diffusion bond between the cover and the body along the periphery parallel to each of the root and the blade tip and along the sides defining the suction or pressure side of the fan blade.

* * * * *